Aug. 16, 1938.   J. MARIQUE   2,127,415
APPARATUS AND PROCESS FOR DETERMINING THE POSITION OF A MOVING OBJECT
Filed Oct. 21, 1935   5 Sheets-Sheet 1

INVENTOR
JEAN MARIQUE
By Emil Bönnelycke
ATTORNEY

Aug. 16, 1938.  J. MARIQUE  2,127,415
APPARATUS AND PROCESS FOR DETERMINING THE POSITION OF A MOVING OBJECT
Filed Oct. 21, 1935  5 Sheets-Sheet 2

INVENTOR
JEAN MARIQUE
By Emil Bönnelycke  ATTORNEY

Aug. 16, 1938.   J. MARIQUE   2,127,415
APPARATUS AND PROCESS FOR DETERMINING THE POSITION OF A MOVING OBJECT
Filed Oct. 21, 1935   5 Sheets-Sheet 3

INVENTOR
JEAN MARIQUE
By Emil Bönnelycke
ATTORNEY

Aug. 16, 1938.    J. MARIQUE    2,127,415
APPARATUS AND PROCESS FOR DETERMINING THE POSITION OF A MOVING OBJECT
Filed Oct. 21, 1935    5 Sheets-Sheet 4

INVENTOR
JEAN MARIQUE
By Emil Bönnelycke ATTORNEY

Patented Aug. 16, 1938

2,127,415

UNITED STATES PATENT OFFICE 2,127,415

APPARATUS AND PROCESS FOR DETERMINING THE POSITION OF A MOVING OBJECT

Jean Marique, Uccle, Belgium, assignor to Société Anonyme Internationale de Télégraphie sans Fils, Brussels, Belgium, a joint-stock company of Belgium Application October 21, 1935, Serial No. 46,042
In Belgium January 24, 1935

3 Claims. (Cl. 250—11)

The present invention relates to an apparatus for determining the position of a moving point by radiogoniometrical bearings of a number of wireless beacons of known positions by means of instantaneous direct reading radiogoniometers, each comprising a rotating exploring system and an indicating device provided with a portion rotating at the same speed as the exploring system in question.

The invention has more particularly in view an apparatus facilitating the passage of a vessel in a comparatively narrow channel such as the entry to a port.

Hitherto, a moving vessel which is to take bearings by the reception of radio-electric signals is obliged to take successively the bearing of two or more wireless beacons and to apply these bearings on a geographical map which necessitates various operations and takes much time.

With the object of obtaining permanently the bearings of the wireless beacons in operation and of determining at each instant the crossing point of these two bearings, in the apparatus according to the invention, the indicating devices of the above-mentioned radiogoniometers are arranged under a common screen, at the summits of a polygon similar to the polygon formed by the wireless beacons.

If the moving object is directed in such manner that the above-mentioned similar polygons are similarly directed with respect to a definite geographical guide direction, the above-mentioned crossing point represents the position of the moving object with respect to the wireless beacons.

If the moving object is not directed in this manner, in order that the crossing point of the bearings may again represent directly on the screen, the position of the moving object with respect to the wireless beacons, it is sufficient for the indicating devices of the radiogoniometers to occupy at each instant with respect to the rotating exporing system, a position which makes, in the proper sense, and with respect to that which they occupy in an ordinary radiogoniometer, an angle equal to those which the corresponding sides of the two said polygons make between themselves.

Now, it is evident that this angle depends upon the orientation of the moving object with respect to a geographical guide direction and the orientation of the sides of the polygon of the wireless beacons with respect to this guide direction.

To permit the relative angular position of the rotating portions of the indicating devices to be varied with respect to the corresponding rotating exploring systems, or, in other words, to cause the variation of the phase of the indicating devices with respect to the exploring systems, it is provided, according to the invention, that the relative displacement (relative dephasing) of the spindles which move the rotating exploring system of each radiogoniometer and the rotating portion of the corresponding indicating device, may be regulated before and during the rotation of these spindles.

By causing the displacement of these spindles to vary before they are set in rotation, the fixed orientation of the polygon of the beacons with respect to the fixed guiding direction may be taken into account, while when causing the variation of the respective displacement of the spindles during their rotation, the variations of orientation of the moving object may be taken into account and thus of the polygons of the radiogoniometers with respect to this same guiding direction.

It is possible to automatically take into account the orientation of the moving object by providing between the said spindles of each radiogoniometer a device controlling their relative displacement according to the indications of the compass or gyrocompass on board.

To obtain the automatic report of the figurative bearing of the moving object on a map, the apparatus according to the invention is furthermore provided with a geographical map traced on a sheet of transparent material superposed on the common screen, this map being drawn to a scale such that the wireless beacons are represented by the points of intersection of the axes of rotation of the rotating portions of the indicating devices on the map superposed on the screen.

The invention also relates to a particular process for taking the bearings of a moving object by determining by radiogoniometry the direction of a number of emitters of known positions.

According to the process of the invention, radio-electric signals are caused to be emitted on the same wave length, successively and according to a comparatively rapid rhythm, by a number of wireless beacons, and the different signals are received by a single instantaneous direct reading radiogoniometer.

A radiogoniometer for carrying out this process preferably comprises, moved at the same speed as its single rotating exploring system, as many indicating devices as there are wireless beacons, these indicating devices being arranged under a common screen at the summits of a polygon similar to the polygon formed by the wireless beacons. It is then possible to profit by the advantages given by the use of a number of wireless beacons and as many radiogoniometers, the indicating devices of which are gathered under one single screen.

The various devices which are applicable to the apparatus with a number of radiogoniometers with a view to make its utilization more practical, are evidently applicable to this radiogoniometer having a single rotating exploring system and several indicating devices.

Other characteristics and details of the invention will appear in the course of the description of the drawings annexed to the present specification and which represent diagrammatically and simply by way of example, various forms of embodying the apparatuses according to the invention.

In these different figures, the same reference signs indicate identical elements.

Figure 1:
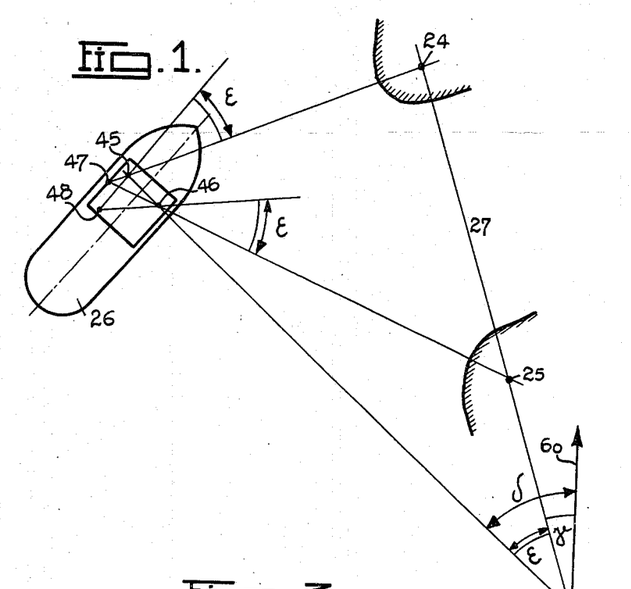
Figure 1 shows diagrammatically the entrance of a port as also the relative position of a vessel with respect to two wireless beacons.

In Figure 1, there is shown a passage 27 serving as the entry to a port into which a vessel 26 is to enter. This passage is marked by two wireless beacons 24 and 25, between which the vessel is to pass. These two wireless beacons emit simultaneously radio-electric signals on different wave lengths.

There are installed on the vessel 26 two radiogoniometers 45 and 46 of instantaneous direct reading, that is to say, radiogoniometers which show at each instant the direction of the emitting station of which they are to take the bearing. When the vessel is sufficiently close to the two wireless beacons, the use of radiogoniometers of this class is indispensable to obtain an exact bearing since, under these conditions, the angular speed of displacement of the vessel with respect to these wireless beacons is necessarily great. The time constant of these radiogoniometers must, therefore, be extremely small. The radiogoniometer 45 is regulated to receive the emission of the wireless beacon 24, and the radiogoniometer 46 to receive that of the wireless beacon 25.

It will be assumed that the radiogoniometers make it possible to determine the directions 45—24, and 46—25. These two directions intersect at 47. It is seen immediately that the triangle 45—46—47 is not similar to the triangle 24—25—47. But if the alignments 45—24 and 46—25 are rotated in the proper direction about 45 and 46 through an angle ε equal to the angle made between the alignments 45—46 and 24—25, there is obtained a triangle 45—46—48 similar to the triangle 47—24—25. The point 48 therefore represents with respect to the two points 45—46 the position of the vessel with respect to the wireless beacons 24 and 25. One of the objects of the invention is to obtain automatically on a map of suitable scale the alignments 45—48 and 46—48 the point of intersection 48 of which permits of representing the position of the moving vessel with respect to the two wireless beacons.

The angle ε is the difference between the angle δ made by the line 45—46 with the North direction 60, and the angle γ made by the line 24—25 of the wireless beacons with the North direction. The angle δ varies with the orientation of the vessel: it may be compensated by subjecting the indications of the radiogoniometers to the compass or gyrocompass on board. The angle γ is fixed and determined for each port entry. It is taken account of in determining, as will be shown below, the suitable initial displacement or dephasing of the exploring system of each radiogoniometer with respect to its indicating device.

It is provided, according to the invention, that the indicating devices of the two radiogoniometers be placed side by side and arranged under a common screen. By indicating device must be understood the device which, associated with a rotating exploring system, enables one to find the direction of an emitter according to the shape of a curve or of a luminous surface, the position of a needle, etc. It generally comprises a member (neon tube, galvanometer or galvanometer part) rotating in synchronism with the rotating exploring system and which will be indicated below as the rotating portion of the indicating device.

Indicating devices particularly well adapted to be used according to the present invention are described for example in United States Patent 1,947,326, and in my copending patent application for "Direct reading radiogoniometer".

In a first embodiment according to the invention, given by way of example, the installation on board the vessel comprises two radiogoniometers (Figure 2) the rotating exploring systems of which, indicated respectively by 2 and 2', are constituted by frames.

Figure 2:
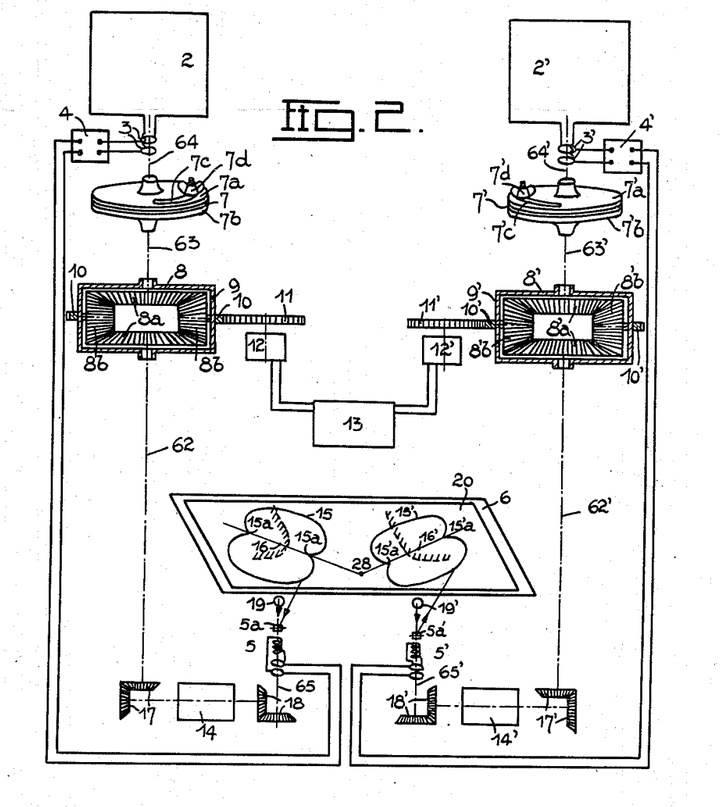
Figure 2 represents diagrammatically partially in elevation and partially in perspective, an apparatus according to the invention comprising two radiogoniometers.

The high frequency currents induced in 2 and 2' are collected by systems of rings and brushes 3 and 3' and carried into amplifiers 4 and 4' which supply indicating devices 5 and 5'. The rotating portions 5a and 5'a of the indicating devices 5 and 5' are driven by motors 14 and 14', gears 18 and 18' and spindles 65 and 65' at the same speed as the corresponding exploring systems 2 and 2' which are driven in the manner which will be explained below. The two indicating devices 5 and 5' are located under a common screen 6 and the points of intersection of their axes of rotation in this screen are indicated by 16 and 16'.

It will be supposed by way of example that the indicating devices are of the type described in United States patent to Braillard 1,947,326 dated February 13, 1934. They then each comprise a mirror galvanometer 5a and 5'a, which project a luminous beam arising from a luminous source 19 and 19' on the screen 6 perpendicular to the axes of rotation of the indicating devices. It is known that in consequence of the rotation at a sufficient speed, of the order of ten revolutions per second, the eye perceives on the screen 6 luminous curves such as 15 and 15' having retracted parts 15a and 15'a which give the direction of the emitters if, by construction, the apparatuses are designed so that the minima give the direction of the emitters, and not the perpendicular direction.

The exploring systems 2 and 2' are driven by the motors 14 and 14' through gears 17 and 17', differential mechanisms 8 and 8' and ordinary coupling devices 7 and 7'.

The differential mechanism 8 comprises, for example, on the one hand two pinions 8a keyed respectively on the spindles 62 and 63 about which a box 9 can rotate, and on the other hand two satellites 8b, the axes of which are integral with the wall of the box 9 so as to be carried round by this when it is made to rotate about the spindles 62 and 63. The rotation of the box 9 about the axis of the two pinions 8a is controlled through the intermediation of gears 10 and 11, by a repeater 12 of the compass or gyrocompass 13 on board. It is arranged by construction that the angle of rotation of the box 9 is one-half the angle of rotation of the vessel with respect to the compass. The angle which the exploring system 2 makes with the indicating device 5 is in this manner subjected to the angle which the vessel makes with the North direction. The differential mechanism 8' comprises the same element as the differential mechanism 8. The references of the elements only differ from each other by the sign ' (8'a, 8'b, 9', 10', 11', 12'.)

The rigid coupling device 7 comprises two plates 7a and 7b keyed respectively on the shaft 63 and a shaft 64. The plate 7a has a circular slot 7c in which can move a bolt 7d integral with the plate 7b and adapted to be fixed with respect to the plate 7a by a nut. When the radiogoniometer does not rotate, it is possible to modify the angular position of the two plates 7a and 7b, that is to say, to modify the initial position of the exploring system 2 with respect to the corresponding indicating device 5. The elements of the coupling device 7' are identical with those of the coupling device 7 and are indicated by reference signs which only differ from those used for the corresponding elements of the device 7 by the sign ' (7', 7'a, 7'b, 7'c, 7'd.)

Figure 3:
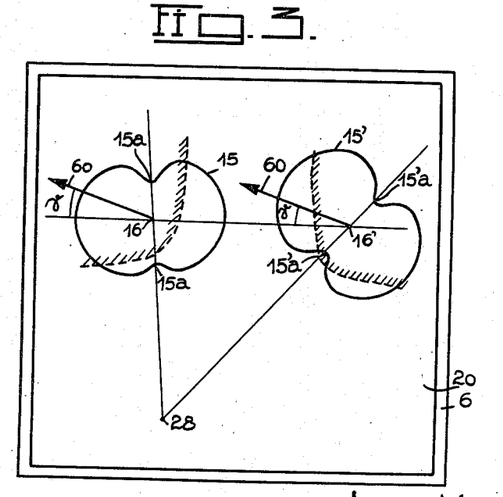
Figure 3 is a plan view of the common screen below which are arranged the indicating devices of the two radiogoniometers of the apparatus according to Figure 2.

What the indicating devices give will now be considered. Figure 3 which represents a plan view of the screen 6, shows that the restricted portions 15a and 15'a of the two luminous curves 15 and 15' determine two lines 16—15a and 16'—15'a which intersect at 28. Owing to the differential mechanisms 8 and 8', the angle δ of Figure 1 which depends upon the orientation of the vessel with respect to North is compensated. The fixed angle γ is compensated by regulating the initial displacement of the exploring systems 2 and 2' with respect to the indicating devices 5 and 5' by means of the rigid coupling devices 7 and 7'.

It is easy to see that, under these conditions, the triangle 16—28—16' found on the screen is similar to the triangle 24—47—25 made by the two wireless beacons and the ship (Figure 1).

By superposing on the screen a geographical map 20 drawn on a sheet of transparent material such as Celluloid to a scale such that the points 16 and 16' represent the wireless beacons 24 and 25, the crossing point 28 of the two directions given by the indicating devices gives directly on the map the position of the ship.

The subjection to the indications of the compass or of the gyrocompass by the intermediation of the repeaters 12 and 12' and the differential couplings 8 and 8' being effected during the rotation of the spindles, it is seen that the same installation may serve for all the port entrances provided with two wireless beacons such as 24 and 25, on condition that the rigid coupling devices 7 and 7' are regulated each time before the rotation of the spindles so as to compensate the fixed angle γ corresponding to the port in question, and placing on the screen 6 a geographical map on a scale such that the points 16 and 16' represent the two wireless beacons.

The rigid coupling device 7 or 7' could furthermore be combined with the differential mechanism 8 or 8' for example by making the keying of the box 9 adjustable with respect to the gear 10 in such manner as to be able to vary its angular position with respect to the latter before the motors are set in rotation. In this case, the pinions 8a would be keyed respectively on the spindles 62 and 64.

To buoy or mark particularly difficult passages (Figure 4) it may be necessary to use three wireless beacons 39—40—41.

Figure 4:
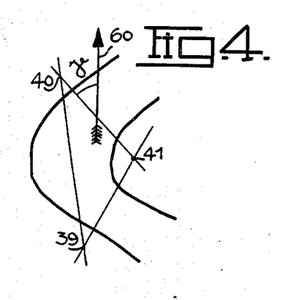
Figure 4 represents diagrammatically a passage marked by three wireless beacons.

On board the vessel, there are installed three radiogoniometers, the three indicating devices of which are gathered under a common screen 6 (Figure 5) and arranged at the summits of a triangle 42—43—44 similar to the triangle 39—40—41 formed by the three wireless beacons.

Figure 5:
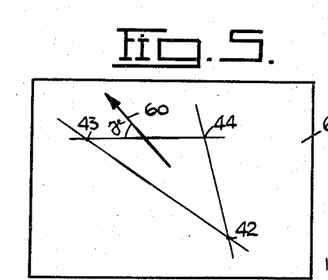
Figure 5 shows the arrangement of the radiogoniometer in an apparatus intended to receive simultaneously the emissions of the three wireless beacons of Figure 4.

If by the initial arrangement of the exploring systems with respect to the rotating portion of the indicating devices, the North direction 60 on the screen is suitably oriented with respect to the triangle 42—43—44, the point of intersection of the three directions given by the indicating devices represents the position of the vessel with respect to the three wireless beacons. There may be superposed on the screen 6 a transparent geographical map as pointed out above on condition that on this map the wireless beacons 39—40—41 are represented by the points 42—43—44.

It is possible to profit by the same advantages as those given by the use of two wireless beacons working simultaneously on different wave lengths and of two direct reading radiogoniometers the indicating devices of which are gathered under a common screen, by employing two wireless beacons emitting alternately on the same wave length and a single instantaneous direct reading radiogoniometer comprising, according to the invention, a single rotating exploring system and two identical indicating devices located side by side under a common screen as in the case of the two radiogoniometers described above and both supplied by the outlet current of a single amplifier.

Figure 6:
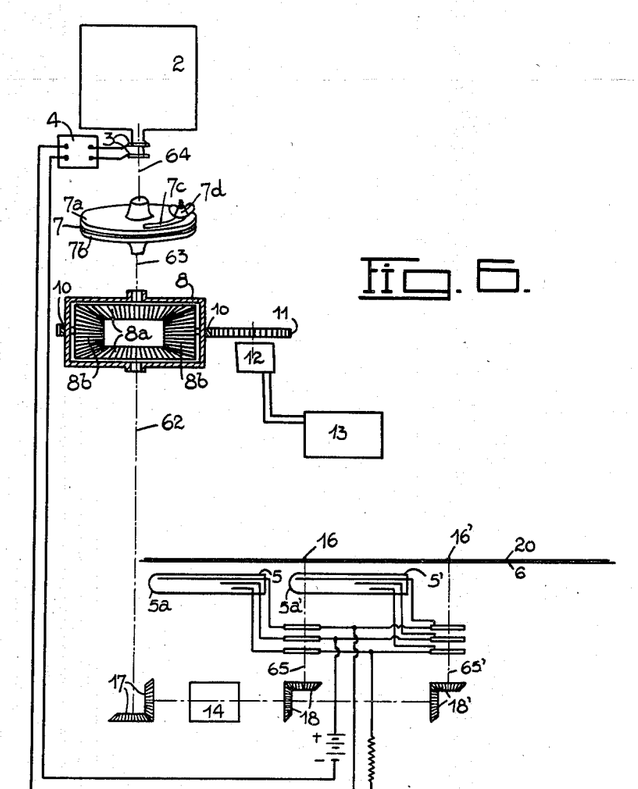
Figure 6 shows diagrammatically partially in elevation and partially in perspective, an apparatus according to the invention comprising a radiogoniometer provided with a single rotating exploring system and two indicating devices with luminous rotating portion.

Figure 6 represents diagrammatically and simply by way of example, the apparatus according to the invention installed on board a vessel. The two indicating devices 5 and 5' which rotate in synchronism with the single exploring system 2 comprise for example, according to my said copending application, neon tubes 5a and 5'a constantly illuminated and the luminescent column of which is in length a function of the amplitude of the electromotive force induced in the rotating exploring system during the rotation thereof.

The land installation comprises two wireless beacons 24 and 25 (Figure 1) emitting in this case alternately on the same wave length. For example, each wireless beacon emits lines of five seconds separated by silences of five seconds, the lines of the one corresponding to the silences of the other. The cycle of five seconds is given by way of example, the most favourable cycle being determined experimentally according to the local conditions and the apparatuses employed.

Figure 7:
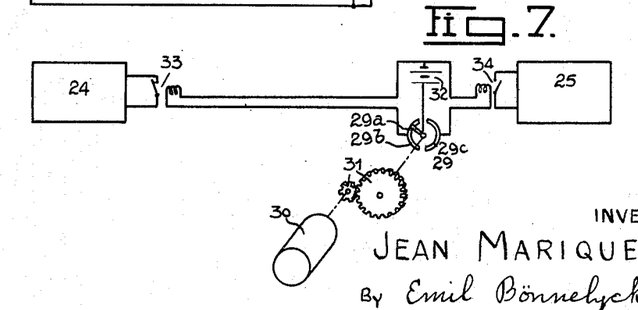
Figure 7 represents a device controlling the successive emission of two wireless beacons on a selected comparatively rapid rhythm.

A method of realizing these alternate emissions is shown diagrammatically on Figure 7. The emission of the wireless beacons 24 and 25 is controlled in known manner, by manipulating relays 33 and 34. These relays are supplied by a source of current 32 through the intermediation of a reversing switch 29. This reversing switch comprises a brush 29a driven at suitable speed by a motor 30 and a reducing gear 31. The brush 29a sweeps successively over two segments 29b and 29c which are connected respectively to the relays 33 and 34.

While the brush 29a is in contact with the segment 29b, the current from the source 32 passes through the coil of the relay 33 and the wireless beacon 24 emits. When the brush 29a is in contact with the segment 29c, it is the relay 34 which is supplied and which effects the emission by the wireless beacon 25. At the same time, the relay 33 being no longer supplied, the wireless beacon 24 no longer emits.

The radiogoniometer on board the vessel is regulated to the common wave length of the two wireless beacons 24 and 25. At a given instant, the two indicating devices 5 and 5' give through the screen 6 the direction of that one of the two wireless beacons which is emitting. With alternate emission of five seconds, there is therefore found (Figure 8) for five seconds the direction 16—35 and 16'—35' of one of the wireless beacons and for the following five seconds, the direction 16—36 and 16'—36' of the other.

Figure 8:
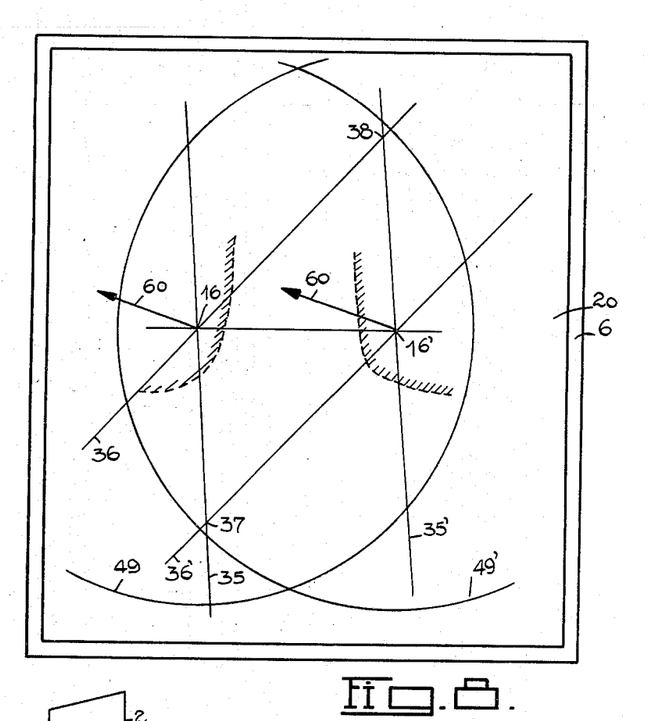
Figure 8 is a plan view of the common screen below which are arranged the indicating devices of the apparatus with a single radiogoniometer according to Figure 6.

There are found on the screen 6 two intersecting points 37 and 38 of these directions which represent two possible positions of the vessel with respect to the points 16 and 16' which represent the wireless beacons 24 and 25. The discrimination is easy because it is known generally on which side of the line 24—25 one is.

As stated above with respect to the apparatus having two radiogoniometers, in order that the point of intersection 37 of the two directions found may represent the position of the vessel on the transparent map, it is necessary that by suitable regulation of the rigid coupling device 7, the angle γ has been compensated.

If the rhythm of the alternations of emission of the two wireless beacons is of the order of five seconds, the directions of the two wireless beacons on the screen will be seen to follow with the same rhythm, and it is necessary to use alidades to materialize the alignments during their respective disappearance on the screen. By using indicating devices and an amplifier having somewhat feeble time constants, it is possible to avoid this inconvenience by accelerating the succession of the alterations of emission for example to one-tenth of a second.

By then causing the rotating exploring system and the rotating portions of the indicating devices to rotate at a speed sufficient that during one emission they have made a number of revolutions, (for example, by causing them to rotate at 50 revolutions per second) in consequence of the persistence of the impressions on the retina, the illusion is created that the luminous images giving the directions of the wireless beacons are permanent and the device then presents all the advantages of the apparatus with two rotating exploring systems and with two indicating devices utilized in combination with two wireless beacons emitting simultaneously on different wave lengths.

At the small distance of the wireless beacons, it is possible to obtain automatically the point of intersection of the two lines; by employing, in fact, neon tubes sufficiently long for the distance 16—16' of the two axes of rotation to be smaller than the radius of the circumferences 49 and 49' (Figure 8) described by the extremities of the neon tubes 5a and 5'a removed from the axis of rotation (Figure 6), the curves which limit the luminous surfaces produced by the two indicating devices intersect under the screen in the interior of the surface common to the two circles limited by the circumferences 49 and 49'.

Figure 9:
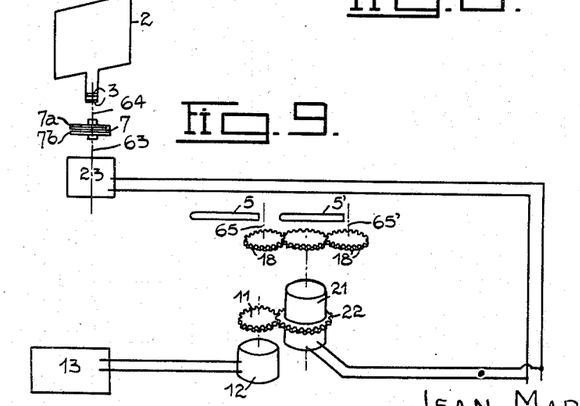
Figure 9 shows partially in elevation and partially in perspective a device for driving the exploring system and the rotating portions of the two indicating devices of the apparatus according to Figure 6 by means of synchronous motors, the relative position of the stators of whch is subject to the indications of the compass or of the gyrocompass on board.

When the exploring system 2 and the indicating devices 5 and 5' are driven by synchronous motors, a differential mechanism may be dispensed with in order to obtain the subjection to the indications of the compass or gyrocompass by causing the repeater 12 to act on the stator of one of the synchronous motors to cause it to rotate by the desired angle. Figure 9 shows diagrammatically such a device. The synchronous motors 21 and 23 drive respectively the indicating devices 5 and 5' and the exploring system 2. The stator of one of the synchronous motors, for example of the motor 21, has a toothed rim 22 engaging with the gear 11 integral with the repeater 12 of the compass or gyrocompass 13. The position of the stator is thus subjected to the indications of the compass or of the gyrocompass 13, whilst the stator of the motor 23 has a fixed position. The result is that the phase between the two rotors is modified according to the indications of the compass or the gyrocompass.

The rigid coupling device 7 might equally well be replaced by a device permitting the initial regulation of the position of the stator of one of the synchronous motors with respect to the device which places it under the control of the indications of the compass or gyrocompass.

If the vessel has no gyrocompass or repeating compass for automatically subjecting the angular position of the exploring systems with respect to the rotating portions of the indicating devices, the position of the box of the differential mechanism (or of the stator of one of the driving synchronous motors) may be regulated by hand according to the indications of the compass or of the gyrocompass in such manner that the directions read on the screen need not be corrected according to the orientation of the vessel.

With the object of rendering the task easier of the person steering the vessel, it might be of advantage to complete the apparatuses described above (see Figures 3 and 8) by a mark of any form which would be displaced on the map by an assistant, according to the indications of the radiogoniometers in such manner as to represent at each instant the situation of the vessel indicated at 26 and 27. The attention of the person steering the vessel can thus be entirely concentrated on the manoeuvres to be carried out.

With the object of making still more striking the indications supplied to the navigator, it can be imagined that this mark is constituted in a particular manner, supplying automatically an indication not only as to the position of the vessel but also as to its orientation.

This mark is formed, for example, by a rectangular mount 50 (Figures 10 and 11) containing a magnetized bar hidden itself by a plate 51 integral therewith and the centre of which is indicated by 54. There is marked on the rectangular mount 50, a point 53 such that the line 53—54 is parallel to the edge 50a of the mount, and such that the distatnce 53—54 is equal to double the radius of the plate 51.

Figure 10:
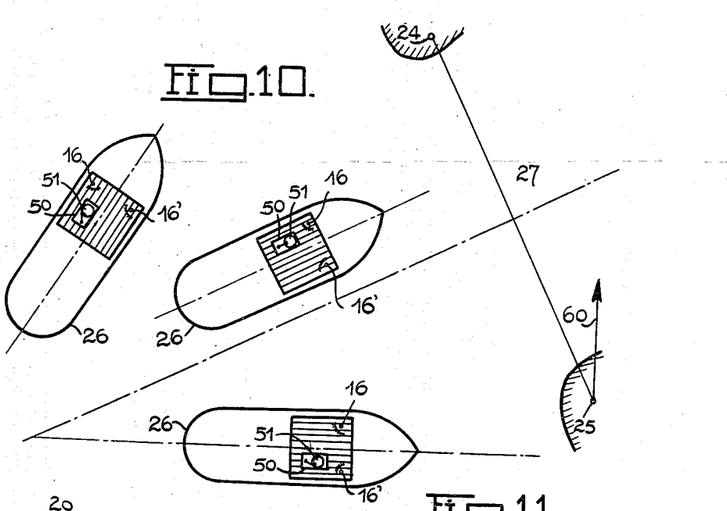
Figure 10 shows diagrammatically in plan a device intended to make the task of the navigator easier.
Figure 11:
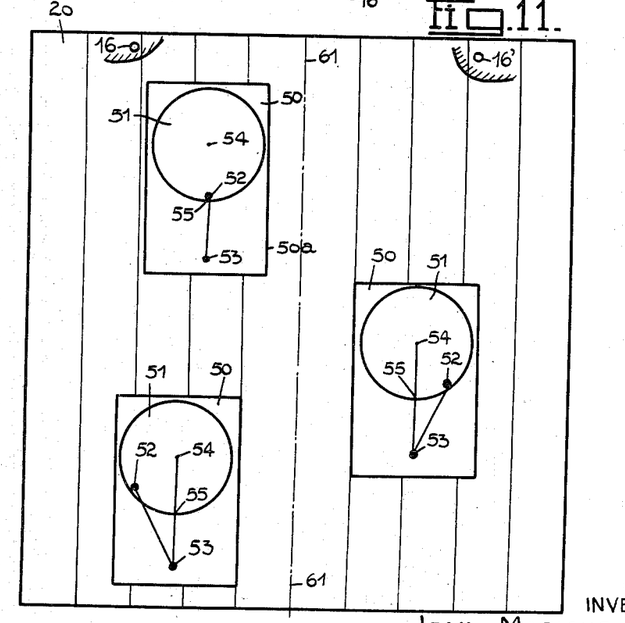
Figure 11 shows this device on a larger scale.

There may be drawn on the edge of the plate 51, a signal 52 such that when the axis of the vessel is parallel to the axis 61 of the channel in which the latter is to enter, the straight line 52—53 is parallel to the edge 50a of the mount, on condition that the latter is oriented on the map parallel to the axis 61, which may be easily realized by drawing preliminarily on the map a network of lines parallel to this axis.

Where the axis of the vessel is slightly oblique with respect to this axis of the channel, the direction 52—53 again indicates on the map approximately the real direction of the vessel, provided that the distance 54—53 of the axis of rotation 54 of the plate 51 to the point 53 is equal to twice the radius of the plate.

If, on the contrary, the axis of the vessel makes a very large angle with the direction of the axis of the channel, the direction 52—53 does not give quantitatively the orientation of the vessel but always clearly indicates the direction of the latter. The real angle may in any case be read immediately on the apparatus. It corresponds to the arc 55—52 the point 55 being on the line 53—54.

It may also be imagined that a magnetized bar is integral with a mount which by means of gears would operate a plate in the reverse direction of its rotation. It would then suffice to draw on the plate a diagonal line, the movements of which would indicate at any moment in a correct manner the orientation of the vessel provided that the edge 50a of the mount is always oriented parallel to the lines of the network indicated above.

It is evident that the devices described may be utilized on board airplanes, dirigibles, automobiles, etc. that is to say, on board all kinds of moving objects.

The embodiments given above are only given as examples; many modifications of detail may be made without altering the functioning of the apparatus.

It is evident for example that the nature of the rotating exploring system will depend in practice upon the wave lengths used; for very short waves, there will be employed with advantages an aerial associated with a flat or parabolic reflector, or a network of aerials. For longer waves, there will be preferred for example a rotating frame or a system of crossed frames connected to a goniometrical coil of the Bellin-Tosi type; these exploring systems may, furthermore, be associated in known manner with an open aerial for the determination of the direction of the emitter the bearing of which is to be found.

The differential mechanisms mentioned above are formed by bevel gears, the same results may be obtained by cylindrical gears.

The rigid coupling device and the differential mechanism may be arranged between the exploring system and the motor as in the examples described above, or between the indicating devices and the motor.

What I claim is:

1. A position indicating system, comprising fixed wireless beacons spaced from one another and emitting successively in all directions radio-electric signals on the same wave length at a relatively rapid rhythm, a moving object, a direct-reading radiogoniometer on said moving object, comprising a single rotatable exploring system, a single amplifier tuned on the common wave length of said wireless beacons, means for applying to said single amplifier the current generated in said exploring system, as many indicating devices as there are wireless beacons of the kind above described comprised in the position indicating system, a luminous rotatable portion for each indicating device, means for applying to said luminous rotatable portions the difference of potential created at the output terminals of said amplifier in order to make the luminous indications dependent on the current generated in the exploring system, means for rotating said rotatable exploring system and luminous rotatable portions at the same speed, said speed being sufficiently high to give the impression of the persistence of the luminous indications, and a geographical map representing the geographical location of said fixed wireless beacons, carried by the moving object and on which the luminous indications appear, said rotatable luminous portions being disposed in such a manner that the impinging points of their axis of rotation in said map coincide with the typical points of said wireless beacons on this map.

2. A position indicating system, comprising fixed wireless beacons spaced from one another and emitting successively in all directions radio-electric signals on the same wave length, a moving object, a direct-reading radiogoniometer on said moving object, comprising a single rotatable exploring system, a single amplifier tuned on the common wave length of said wireless beacons, means for applying to said single amplifier the current generated in said exploring system, as many indicating devices as there are wireless beacons of the kind above described comprised in the position indicating system, a luminous rotatable portion for each indicating device, means for applying to said luminous rotatable portions the difference of potential created at the output terminals of said amplifier in order to make the luminous indications dependent on the current generated in the exploring system, means for rotating said rotatable exploring system and luminous rotatable portions at the same speed, said speed being such that said rotatable exploring system and luminous portions make more than one revolution during the duration of emission of each wireless beacon, the rhythm of succession of these emissions being sufficiently rapid in order that, in consequence of the persistence of the luminous impressions on the retina, the luminous indications corresponding to the intermittent emissions of all said wireless beacons seem permanent, and a geographical map representing the geographical location of said fixed wireless beacons, carried by the moving object and on which the luminous indications appear, said rotatable luminous portions being disposed in such a manner that the impinging points of their axis of rotation in said map coincide with the typical points of said wireless beacons on this map.

3. A position indicating system, comprising fixed wireless beacons spaced from one another and emitting successively in all directions radio-electric signals on the same wave length at a relatively rapid rhythm, a moving object, a direct-reading radiogoniometer on said moving object, comprising a single rotatable exploring system, a single amplifier tuned on the common wave length of said wireless beacons, means for applying to said single amplifier the current generated in said exploring system, as many indicating devices as there are wireless beacons of the kind above described comprised in the position indicating system, a luminous rotatable portion for each indicating device, means for applying to said luminous rotatable portions the difference of potential created at the output terminals of said amplifier in order to make the luminous indications dependent on the current generated in the exploring system, a rotatable spindle carrying the rotatable exploring system, another rotatable spindle rotating at the same speed as the first one and driving said luminous rotatable portions, two synchronous motors for rotating each one of said spindles, means for rotating said synchronous motors at a same speed high enough for the luminous indications of the luminous rotatable portions to give the illusion that they are permanent, means operable in response to a turning movement of said moving object for effecting a rotation of the stator of one of these synchronous motors relatively to the stator of the other synchronous motor whereby the effect of such turning movement on said luminous rotatable portions is compensated for, and a geographical map representing the geographical location of said fixed wireless beacons, carried by the moving object and on which the luminous indications appear, said rotatable luminous portions being disposed in such a manner that the impinging points of their axis of rotation in said map coincide with the typical points of said wireless beacons on ths map.

JEAN MARIQUE.